United States Patent
Wagner et al.

(10) Patent No.: US 7,665,301 B2
(45) Date of Patent: Feb. 23, 2010

(54) METHOD FOR OPERATING AN INTERNAL COMBUSTION ENGINE

(75) Inventors: Horst Wagner, Stuttgart (DE); Maik Schaufler, Hohenacker (DE); Brahim Baqasse, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 11/607,498

(22) Filed: Nov. 30, 2006

(65) Prior Publication Data

US 2007/0137198 A1 Jun. 21, 2007

(30) Foreign Application Priority Data

Dec. 19, 2005 (DE) .................. 10 2005 060 671

(51) Int. Cl.
*F02D 23/00* (2006.01)
*F02B 3/00* (2006.01)
*F02B 7/00* (2006.01)

(52) U.S. Cl. ................. 60/601; 123/299; 123/431

(58) Field of Classification Search ........... 60/600–603; 123/564, 299, 445, 198 F, 527, 431
See application file for complete search history.

(56) References Cited

U.S. PATENT DOCUMENTS

| | | | | |
|---|---|---|---|---|
| 4,709,676 A | * | 12/1987 | Monaghan | ................. 123/383 |
| 5,174,119 A | * | 12/1992 | Hanauer et al. | ............... 60/602 |
| 5,228,292 A | * | 7/1993 | Hanauer et al. | ............... 60/602 |
| 5,695,430 A | * | 12/1997 | Moyer | ....................... 123/527 |
| 6,604,361 B2 | * | 8/2003 | Buckland et al. | .......... 60/605.2 |
| 6,959,686 B2 | * | 11/2005 | Lee | ............................ 123/564 |
| 7,128,052 B1 | * | 10/2006 | Reed et al. | ............... 123/198 F |
| 7,302,933 B2 | * | 12/2007 | Kerns | ........................ 123/431 |
| 2006/0196182 A1 | * | 9/2006 | Kimoto et al. | ............ 60/605.1 |
| 2007/0204602 A1 | * | 9/2007 | Kogo | .......................... 60/299 |
| 2007/0271909 A1 | * | 11/2007 | Philippe et al. | ............ 123/445 |

FOREIGN PATENT DOCUMENTS

| | | | |
|---|---|---|---|
| FR | 2856432 A1 | * | 12/2004 |
| JP | 04295134 A | * | 10/1992 |
| JP | 05113127 A | * | 5/1993 |
| JP | 09112287 A | * | 4/1997 |

OTHER PUBLICATIONS

A fully certified English Translation of Kawamura (Pub. No. JP 04-295134 A).*

* cited by examiner

*Primary Examiner*—Thai Ba Trieu
(74) *Attorney, Agent, or Firm*—Kenyon & Kenyon LLP

(57) ABSTRACT

In a method for operating an internal combustion engine, the exhaust gas energy of the internal combustion engine is increased when a variable that is characteristic of the compression of the compression device reaches a predefined value, the variable that is characteristic of the compression is the pressure ratio between the pressure downstream from the compressor and the pressure upstream from the turbine.

20 Claims, 4 Drawing Sheets

METHOD FOR OPERATING AN INTERNAL COMBUSTION ENGINE

FIELD OF THE INVENTION

The present invention relates to a method and a control unit for operating an internal combustion engine having a compression device.

BACKGROUND INFORMATION

A turbocharger or a mechanical supercharger (compressor) includes a compression device which is directly or hydraulically driven by a crankshaft (in the case of a compressor) or by an exhaust gas turbine (in the case of a turbocharger). As a rule, turbocharged diesel engines have a large volume between the compression side of the turbocharger and the exhaust of the internal combustion engine. This volume is composed of the volume of the charge air cooler and the volumes of the piping. In contrast, the manifold lengths and the volume between the exhaust of the internal combustion engine and the exhaust gas turbine of the turbocharger is very small.

In the event of a rapid load drop, e.g., during rapid gas ease-off from the full-load range, the pressure upstream from the exhaust gas turbine drops much more quickly than the pressure downstream from the compression device. This results in an unfavorable pressure gradient which may result in fluctuations of the charge pressure or in a recirculation of the compressed fresh air through the compression device (against the nominal flow direction). This causes undesirable, unpleasant flow noises, and increased component stress occurs, which may result in the breakdown of the hydrodynamic lubrication of the turbocharger shaft, for example. This behavior is particularly pronounced in vehicles having a torque converter when the converter bridging clutch is disengaged since, in the event of a load drop, the engine speed and thus also the air mass flow through the engine quickly drop.

The following measures for avoiding this unfavorable pressure situation are known:

- closing the throttle valve and opening the exhaust gas recirculation, thereby enabling a reduction of the pressure gradient via the exhaust gas recirculation valve from the intake side to the exhaust side;
- raising the engine speed and adjusting via the idling regulation, thereby preventing a rapid drop in the engine speed and increasing the air mass flow through the engine; and
- delayed torque reduction via mobility filters, thereby increasing the enthalpy and thus also the pressure between the compression side of the turbocharger and the exhaust of the internal combustion engine as well as the air mass flow through the engine.

As a rule, the rail pressure is set as a function of the load in common rail systems in such a way that at high loads high rail pressures are set and at low loads low rail pressures are set, for acoustic reasons, among other things. In common rail systems having single-actuator rail pressure regulation (demand-regulated), a reduction in the rail pressure is only possible via injections or leakage losses of the injectors. This results, e.g., in the case of injectors having low leakage losses, in that the high rail pressure cannot be reduced after a rapid load drop. In the event of a subsequent small torque request, e.g., by the idling controller, a loud combustion noise occurs. It is known to reduce the rail pressure using delayed torque reduction via a mobility filter, which results in injections occurring for a longer period of time, which reduces the rail pressure. The same effect may be brought about by limiting the gradient of the driver demand.

The above-described measures for avoiding a critical pressure gradient between the pressure downstream from the compression device of the turbocharger and the pressure upstream from the exhaust gas turbine have a direct effect on the driving performance and thus on the driving comfort. The same is also true for the above-described measures for reducing the rail pressure.

Therefore, it is an object of the present invention to provide a method for avoiding a charge recirculation in the event of rapid load drops in which an effect on the driving performance is reduced as much as possible, as well as reducing the overshooting of the rail pressure during rapid load drops.

SUMMARY OF THE INVENTION

In the present method for operating an internal combustion engine having a compression device, the exhaust gas energy of the internal combustion engine is increased when a characteristic variable for the compression of the compression device reaches a predefined value. The compression device includes a compressor in the air intake duct of the internal combustion engine, the variable of the compression device characteristic for the compression being the ratio between the output pressure of the compressor and a variable that is characteristic for the drive power of the compressor, such as the engine speed or the torque of a compressor in the case in which the compression device includes such a compressor, driven by the crankshaft of the internal combustion engine, for compressing the air supplied to the internal combustion engine, or the pressure upstream from the turbine in the case in which the compression device includes a turbocharger. In an example embodiment of the present invention, the compression device includes a turbocharger having a compressor and a turbine driving the compressor, and the variable characterizing the compression is the pressure ratio between the pressure downstream from the compressor and the pressure upstream from the turbine. The terms "upstream" and "downstream" are to be understood to mean in the flow direction of the intake air and the exhaust gas; downstream from the compressor thus means on the pressure side of the compressor and thus between the compressor and the intake into the cylinder. Correspondingly, upstream from the turbine is the exhaust system between the exhaust from the cylinder and the turbine. The pressure upstream from the exhaust gas turbine essentially determines the torque generated by the exhaust gas turbine. If this too is low, then the power of the compressor is insufficient for pumping against the pressure between compressor and intake of the internal combustion engine (i.e., against the pressure downstream from the compressor), so that air may flow (back) against the pumping direction of the compressor.

In an example embodiment of the present invention, the internal combustion engine includes a fuel injection device, e.g., a common rail injection device, and the exhaust gas energy of the internal combustion engine is increased by injecting an additional fuel quantity when a predefined value for a control deviation of the rail pressure of the fuel injection device is reached. The control deviation is the difference between setpoint pressure and actual rail pressure. The additional fuel quantity is injected when the predefined value for the pressure ratio between the pressure downstream from the compressor and the pressure upstream from the turbine is reached and/or the predefined value for the control deviation of the rail pressure of the fuel injection device is reached. In contrast to the conventional measures in the art, the increase in the exhaust gas energy via injection of an additional fuel quantity has the advantage that it may take place by maintaining a given torque and does not affect the driving performance. The pressure gradient between the pressure downstream from the compressor of the turbocharger and the pressure upstream from the exhaust gas turbine is reduced due to the increase in the exhaust gas energy, and ultimately a charge recirculation is thus avoided. Furthermore, the method according to the present invention has the advantage over the conventional methods such as delayed torque reduction and increase in the setpoint engine speed, in that the present invention facilitates operation with lower fuel consumption due to better efficiency. Moreover, undesirable component stresses caused by, e.g., rail pressure overshooting or interrupted charge lubrication, and wear on actuators, such as the throttle valve and the exhaust gas recirculation valve, are avoided.

It may be provided that the exhaust gas energy of the internal combustion engine is increased in that a combustion process is conducted with lower thermal efficiency. This may take place in that the exhaust gas energy of the internal combustion engine is increased by retarding the combustion. Lower thermal efficiency of the process means that less energy is converted into mechanical work and more energy remains in the gas, so that a sufficiently high enthalpy gradient may be processed by the turbine. The overall thermal efficiency of the internal combustion engine becomes paradoxically higher since, in an optimum process, an unnecessary torque must be provided by the internal combustion engine in order to provide the necessary exhaust gas energy.

It may be provided that the additional fuel quantity is at least partially injected in a main injection. Likewise, the additional fuel quantity may be at least partially injected in a secondary injection; the total additional fuel quantity to be injected may be converted into exhaust gas energy in both cases. As an alternative, the fuel quantity of the main injection may be reduced and the fuel quantity of the secondary injection and possibly the additional fuel quantity may be increased by the fuel quantity by which the main injection is reduced. Fuel, which previously was injected in the main injection, is thus now injected in the secondary injection. The injection of additional fuel may then be omitted (the additional fuel quantity becomes zero). Additionally or alternatively, the combustion center point may be adjusted by injection characteristic formation in such a way (generally in the retard direction) that the additionally injected fuel quantity is almost completely converted into exhaust gas energy.

This retardation of the combustion center point may be implemented by measures such as an appropriate adjustment of the start of injection and the duration of injection. This has the advantage that the mechanical efficiency of the internal combustion engine is reduced and at the same time the exhaust gas energy is increased. The increased injection quantities necessary for the method according to the present invention cause an advantageous rapid reduction of the rail pressure.

The additionally injected fuel quantity may be distributed to the main injection and the secondary injection, a portion of the additional fuel quantity being injected in the main injection and the remaining portion being injected in the secondary injection. It is likewise possible to adjust the combustion center point during the main injection by suitably forming the injection characteristic in such a way that the portion of the additional fuel quantity injected in the main injection is almost completely converted into exhaust gas energy.

A deterioration of the mechanical efficiency and as a result an increase in the exhaust gas energy may alternatively also be implemented via an increase in the pilot injection; it is not necessary in this case to define a special operating mode for the method according to the present invention, but one may resort to an existing injection model such as particulate filter regeneration. The check for the rail pressure control deviation is omitted in alternative injection systems without a rail. The check for the pressure ratio between the pressure downstream from the compressor and the pressure upstream from the turbine is omitted in engines not charged with a turbocharger or in engines having a small storage volume; only the rail pressure is thus monitored.

The present invention also provides a control unit for controlling an internal combustion engine having a compression device, the exhaust gas energy of the internal combustion engine being increased when a variable of the compression device characteristic for a compression reaches a predefined value.

DETAILED DESCRIPTION

Figure 1:
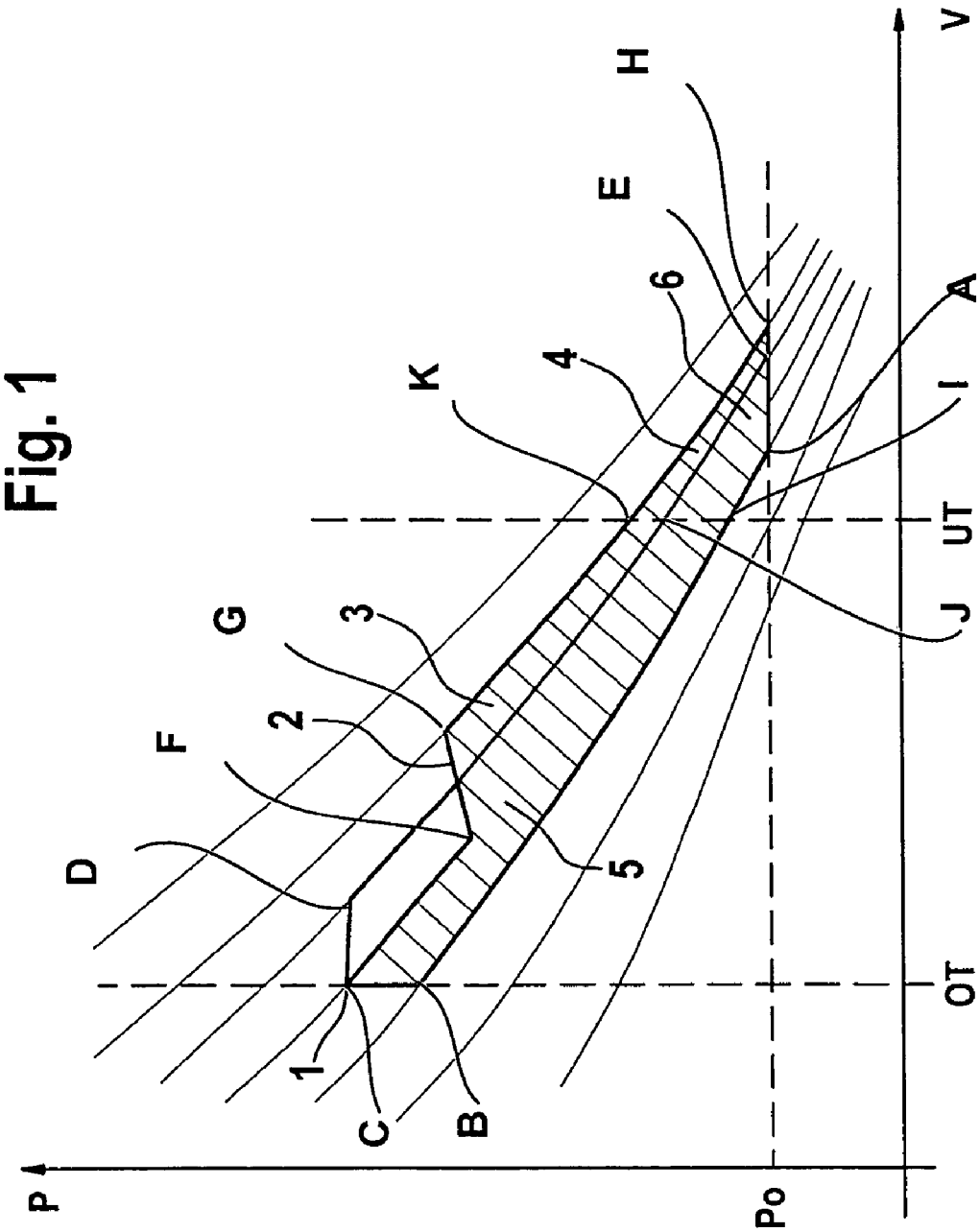
FIG. 1 shows a pressure-volume diagram illustrating a conventional combustion process and a combustion process according to the present invention.

FIG. 1 shows a pressure-volume diagram illustrating a conventional combustion process and a combustion process according to the present invention, the conventional combustion process being the curve through points A, B, C, D, E and the combustion process according to the present invention being the curve through points A, B, C, F, G, H. The area enclosed by the combustion process curve according to the present invention is additionally hatched. Area 3 of the cycle according to the related art and area 5 of the cycle according to the present invention between the top dead center OT and the bottom dead center UT correspond to the mechanical energy generated in the work cycle which is proportional to the torque request at a given engine speed and should be equal for both cycles. Therefore the following holds true: $W_{KW}=W^*_{KW}$, where $W_{KW}$ is the mechanical energy generated in the conventional combustion process and $W^*_{KW}$ is the mechanical energy generated in the combustion process according to the present invention. Heat flows $Q_{HE}$ and $Q_{NE}$ conveyed in main injection 1 and secondary injection 2 are, in the case of complete combustion, in good approximation proportional to the injected fuel quantities $q_{HE}$ and $q_{NE}$. According to the present invention, an additional fuel quantity is injected when a predefined value for the critical pressure ratio (P2/P3) between pressure P3 upstream from the exhaust gas turbine of the turbocharger and pressure P2 downstream from the compressor and/or a critical value for the control deviation of the rail pressure is/are reached or is/are approximately reached. According to the present invention, the additional fuel quantity may be injected in main injection 1, in secondary injection 2 or in such a way that a portion of the additional fuel quantity is injected in main injection 1 and the remaining portion is injected in secondary injection 2.

The sum of heat flows ($Q_{HE}+Q_{NE}$) supplied during the conventional combustion process is smaller than the sum of heat flows ($Q^*_{HE}+Q^*_{NE}$) supplied during the combustion process according to the present invention. Area 6 for the known cycle and area 4 for the cycle according to the present invention between bottom dead center UT and the section indicating ambient pressure PO correspond to the exhaust gas energy supplied to the exhaust gas turbine. The known cycle encloses area 6 through points E, A, I, J, and the cycle according to the present invention encloses area 4 through points H, A, I, K. The increased exhaust gas energy achieved by the method according to the present invention, represented by area 4, is clearly apparent. It is also apparent in FIG. 1 that, for achieving the same exhaust gas energy, a greater injection quantity is necessary in a conventional cycle than in the process according to the present invention. Moreover, the mass flow of the exhaust gas is increased due to the method according to the present invention, since the number of gas molecules is increased due to injection of greater fuel quantities.

Figure 2:
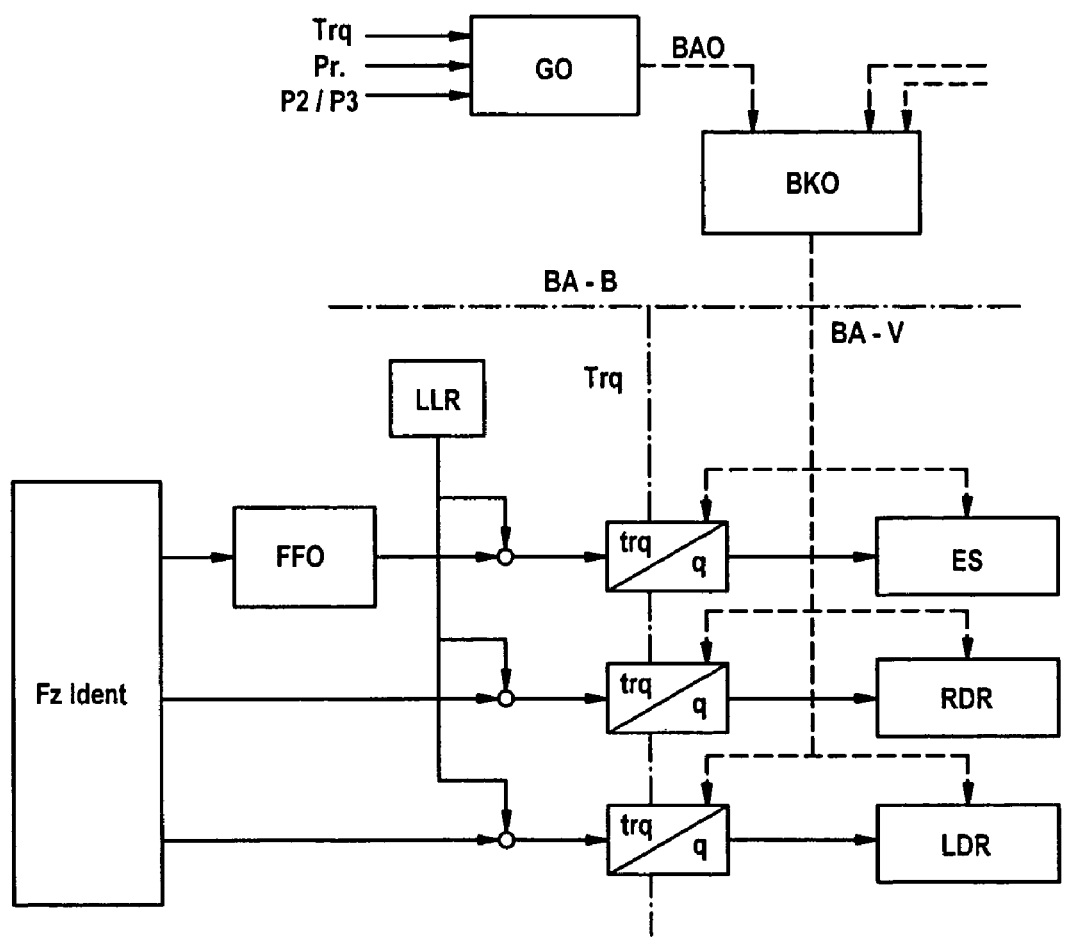
FIG. 2 shows a block diagram illustrating an example method according to the present invention.

FIG. 2 shows a block diagram illustrating an example method of an electronic diesel regulation according to the present invention. Multiple operating modes are generally defined in the electronic diesel controller, such as the particulate filter regeneration or the (partial) homogeneous combustion. Appropriate setpoint values for rail pressure, charge pressure and injection characteristic are assigned to each operating mode. The driver and vehicle functions FzIdent deliver the further regulation systems of injection system ES, rail pressure regulation RDR, and charge pressure regulation LDR either directly or via a guidance forming device FFO. For this purpose, signal LLR and driver and vehicle functions FzIdent are converted into torque request $t_{rq}$ and injection quantities q are determined therefrom; this is indicated by modules trq/q. An operating mode specification BA-V results from an operating mode determination BA-B. A gradient monitor GO evaluates on the basis of the variables torque request $t_{rq}$ of the driver (including its gradient), instantaneous torque request (including its gradient), control deviation of rail pressure PR, and pressure ratio P2/P3, whether a switchover to the combustion process according to the present invention is necessary. If the answer is yes, the gradient monitor transfers an operating mode request BAO (BA request) for the combustion process according to the present invention to operating mode coordinator BKO which, after coordination with other operating requests, enables, if needed, the operating request for the combustion process according to the present invention, whereupon the torque request is converted into injection quantity q according to the mechanical efficiency established by the combustion process. The rail pressure regulation (R-pressure regulation) and the charge pressure regulation also use the corresponding setpoint values.

Figure 3:
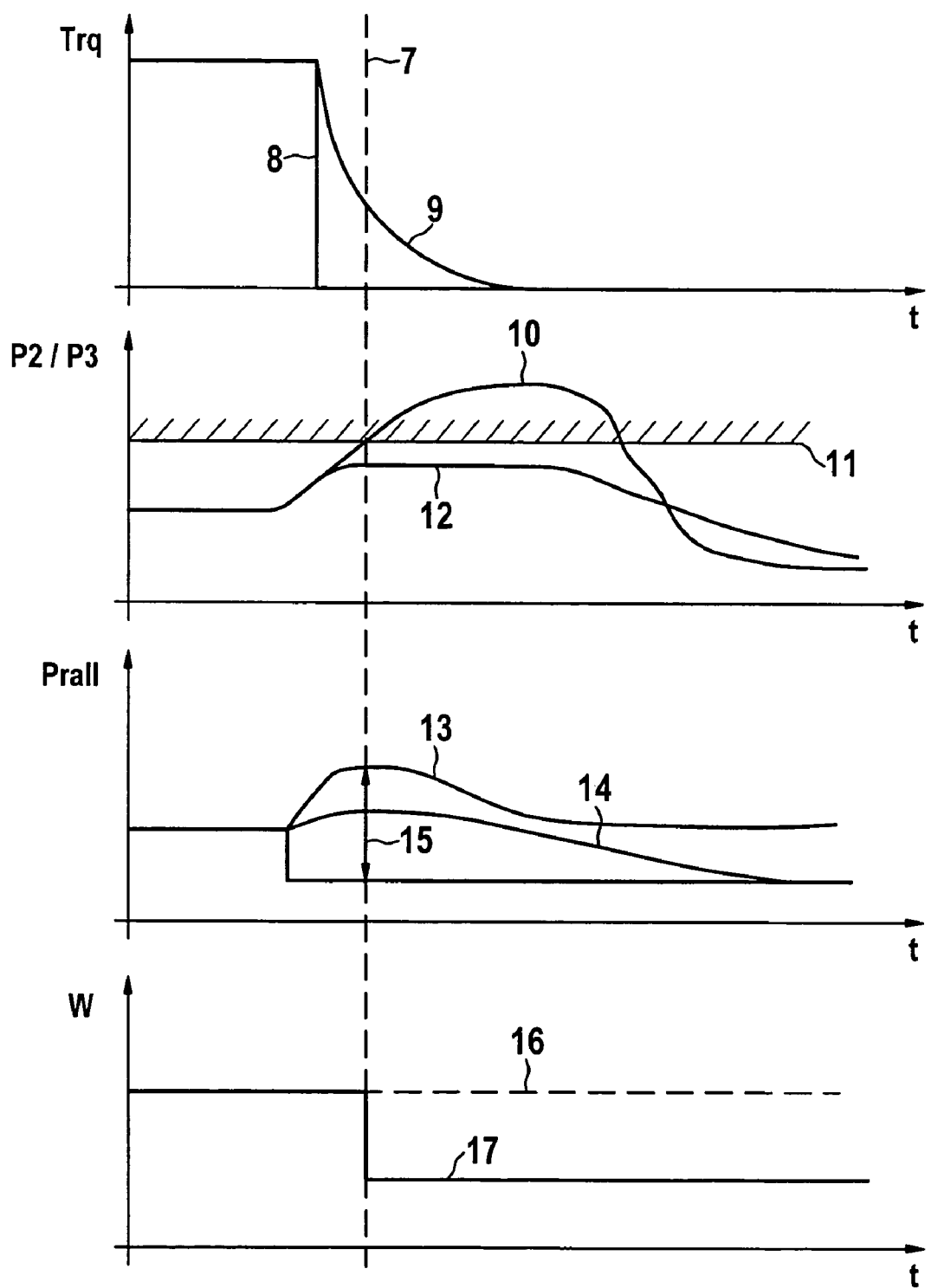
FIG. 3 shows signal curves of relevant variables in a conventional combustion process and a combustion process according to the present invention.

FIG. 3 schematically shows the signal curves during a rapid reduction in the load by the driver. Compared are the signal curves with and without operating mode switchover 7 for the combustion process according to the present invention. The upper illustration initially shows the signal curve of driver torque specification 8 together with filtered torque specification 9, the filtering as shown taking place with a short time constant in order to implement a spontaneous driving performance. The second illustration from the top shows the signal curve of pressure ratio P2/P3 with and without the combustion characteristic formation according to the present invention. It is apparent that signal curve 12 assigned to the combustion characteristic formation of the present invention clearly remains below critical pressure ratio 11 due to the retardation, while the critical pressure ratio is clearly disadvantageously exceeded (see signal curve 10) in the conventional operating mode with optimum mechanical efficiency. The combustion center point is a point in time at which the combustion taking place over a time period may be theoretically combined into one point in time with the same effect. For example, the combustion center point may be changed by the injection characteristic, i.e., the fuel quantity injected over time, or by the ignition of the fuel/air mixture. A change in the assignment of the injected fuel quantity to the appropriate point in time or time period is referred to as injection characteristic formation. A retardation of the combustion center point is achieved by a later injection, e.g., by shifting the mass of the injected fuel quantity to later times, or by a later ignition.

Control deviation 15 of rail pressure 13 of the next illustration below behaves disadvantageously in a similar manner. It is apparent that rail pressure 13 in the conventional combustion process formation is clearly above measured rail pressure 14 in the combustion process formation according to the present invention which is attributed to an increased rail pressure drop due to increased injection quantities in the combustion process formation according to the present invention.

The bottom illustration of FIG. 3 finally shows mechanical efficiency W for the combustion process formation according to the present invention (see signal curve 17) and for the conventional combustion process formation (see signal curve 16). An advantageous drop in the mechanical efficiency is apparent.

Figure 4:
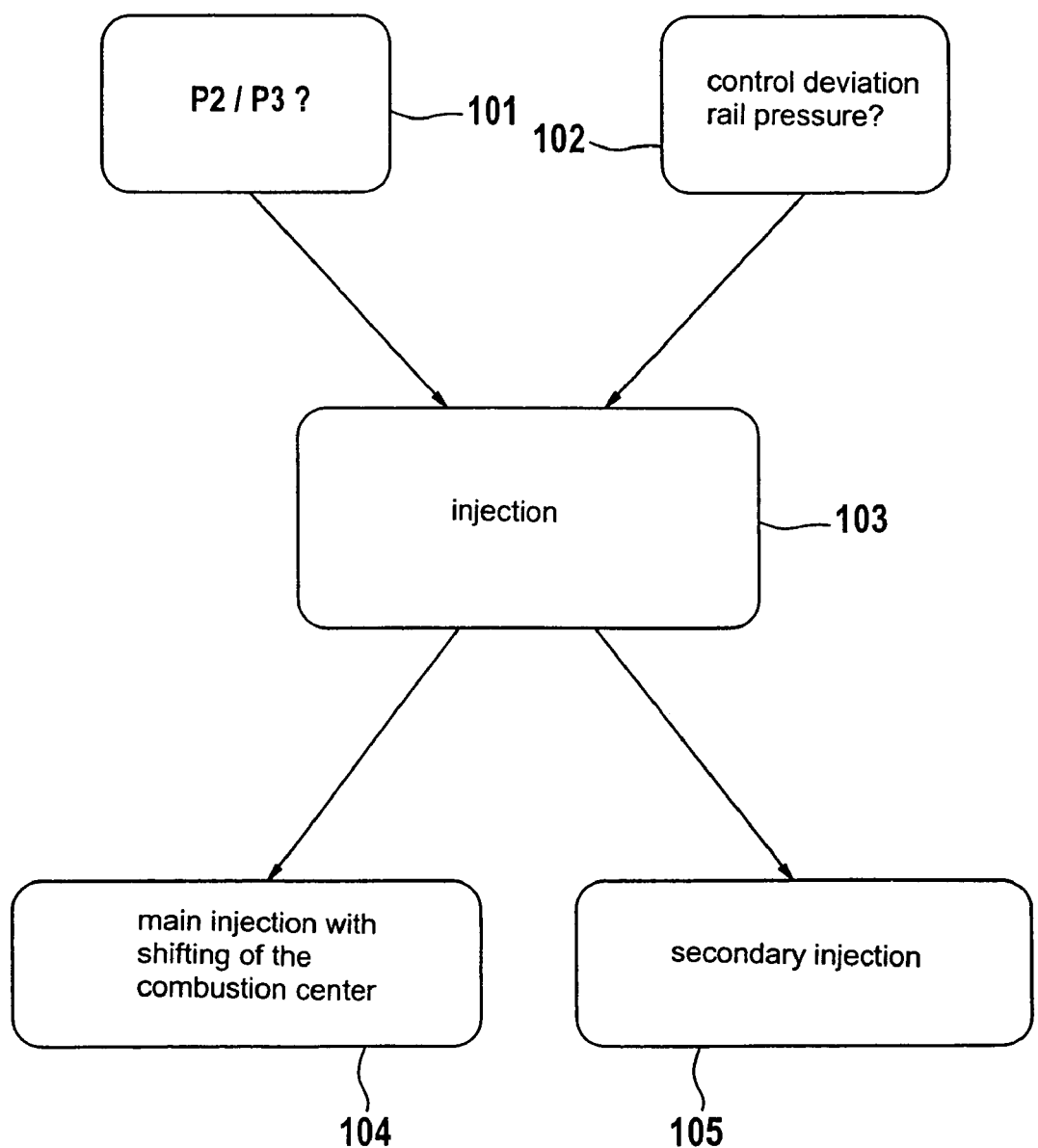
FIG. 4 shows a flowchart illustrating an example method according to the present invention.

FIG. 4 shows a highly schematic process diagram for illustrating the method according to the present invention. After checking the ascertained values for pressure ratio P2/P3 in step 101 and the ascertained values for the control deviation of the rail pressure in step 102, injection takes place in step 103, provided that at least one of the two variables corresponds to a critical predefined value or approaches it. The additional fuel quantity may be injected in step 104 in the main injection or in step 105 in the secondary injection, it also being possible to inject a portion of the fuel quantity to be additionally injected in the main injection and the remaining portion in the secondary injection.

What is claimed is:

1. A method for operating an internal combustion engine having a compression device, comprising:
   increasing an exhaust gas energy of the internal combustion engine when a variable that is characteristic of a compression of the compression device reaches a predefined value;
   wherein:
   the compression device includes a compressor in an air intake duct of the internal combustion engine;
   the variable that is characteristic of the compression of the compression device is a ratio between an output pressure of the compressor and a variable that is characteristic of a drive power of the compressor; and
   the exhaust gas energy of the internal combustion engine is increased by performing a combustion process with low thermal efficiency.

2. The method as recited in claim 1, wherein the compression device includes a turbocharger having a compressor and a turbine driving the compressor, and wherein the variable that is characteristic of the compression is a pressure ratio between a pressure downstream from the compressor and a pressure upstream from the turbine.

3. The method as recited in claim 1, wherein the increasing of the exhaust gas energy of the internal combustion engine includes injecting an additional fuel quantity.

4. The method as recited in claim 1, the increasing of the exhaust gas energy of the internal combustion engine includes retarding a combustion center point.

5. The method as recited in claim 4, wherein the combustion center point is adjusted by an injection characteristic formation in such a way that an additionally injected fuel quantity is completely converted into exhaust gas energy.

6. A method for operating an internal combustion engine having a compression device, comprising:
increasing an exhaust gas energy of the internal combustion engine when a variable that is characteristic of a compression of the compression device reaches a predefined value;
wherein:
the compression device includes a common-rail fuel injection device and a compressor in an air intake duct of the internal combustion engine;
the variable that is characteristic of the compression of the compression device is a ratio between an output pressure of the compressor and a variable that is characteristic of a drive power of the compressor; and
the exhaust gas energy of the internal combustion engine is increased when a predefined value for a control deviation of a rail pressure of the common-rail fuel injection device is reached.

7. The method as recited in claim 6, wherein the compression device includes a turbocharger having a compressor and a turbine driving the compressor, and wherein the variable that is characteristic of the compression is a pressure ratio between a pressure downstream from the compressor and a pressure upstream from the turbine.

8. The method as recited in claim 6, wherein the exhaust gas energy of the internal combustion engine is increased by injecting an additional fuel quantity.

9. The method as recited in claim 6, wherein the exhaust gas energy of the internal combustion engine is increased by retarding a combustion center point.

10. The method as recited in claim 9, wherein the combustion center point is adjusted by an injection characteristic formation in such a way that an additionally injected fuel quantity is completely converted into exhaust gas energy.

11. A method for operating an internal combustion engine having a compression device, comprising:
increasing an exhaust gas energy of the internal combustion engine when a variable that is characteristic of a compression of the compression device reaches a predefined value;
wherein:
the compression device includes a compressor in an air intake duct of the internal combustion engine;
the variable that is characteristic of the compression of the compression device is a ratio between an output pressure of the compressor and a variable that is characteristic of a drive power of the compressor;
the exhaust gas energy of the internal combustion engine is increased by injecting an additional fuel quantity; and
the additional fuel quantity is at least partially injected in a main injection.

12. The method as recited in claim 11, wherein the compression device includes a turbocharger having a compressor and a turbine driving the compressor, and wherein the variable that is characteristic of the compression is a pressure ratio between a pressure downstream from the compressor and a pressure upstream from the turbine.

13. The method as recited in claim 11, the increasing of the exhaust gas energy of the internal combustion engine includes retarding a combustion center point.

14. The method as recited in claim 13, wherein the combustion center point is adjusted by an injection characteristic formation in such a way that an additionally injected fuel quantity is completely converted into exhaust gas energy.

15. A method for operating an internal combustion engine having a compression device, comprising:
increasing an exhaust gas energy of the internal combustion engine when a variable that is characteristic of a compression of the compression device reaches a predefined value;
wherein:
the compression device includes a compressor in an air intake duct of the internal combustion engine;
the variable that is characteristic of the compression of the compression device is a ratio between an output pressure of the compressor and a variable that is characteristic of a drive power of the compressor;
the exhaust gas energy of the internal combustion engine is increased by injecting an additional fuel quantity; and
the additional fuel quantity is at least partially injected in a secondary injection.

16. The method as recited in claim 15, wherein the compression device includes a turbocharger having a compressor and a turbine driving the compressor, and wherein the variable that is characteristic of the compression is a pressure ratio between a pressure downstream from the compressor and a pressure upstream from the turbine.

17. The method as recited in claim 15, the increasing of the exhaust gas energy of the internal combustion engine includes retarding a combustion center point.

18. The method as recited in claim 17, wherein the combustion center point is adjusted by an injection characteristic formation in such a way that an additionally injected fuel quantity is completely converted into exhaust gas energy.

19. A control unit for an internal combustion engine having a compression device, the compression device including a common-rail fuel injection device and a compressor in an air intake duct of the internal combustion engine, the control unit comprising:
an arrangement for increasing an exhaust gas energy of the internal combustion engine when a variable that is characteristic of a compression of the compression device reaches a predefined value;
wherein:
the variable that is characteristic of the compression of the compression device is a ratio between an output pressure of the compressor and a variable that is characteristic of a drive power of the compressor; and
the exhaust gas energy of the internal combustion engine is increased when a predefined value for a control deviation of a rail pressure of the common-rail fuel injection device is reached.

20. The control unit as recited in claim 19, wherein the exhaust gas energy of the internal combustion engine is increased by performing a combustion process with low thermal efficiency.

* * * * *

UNITED STATES PATENT AND TRADEMARK OFFICE
CERTIFICATE OF CORRECTION

PATENT NO. : 7,665,301 B2  Page 1 of 1
APPLICATION NO. : 11/607498
DATED : February 23, 2010
INVENTOR(S) : Wagner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 309 days.

Signed and Sealed this

Seventh Day of December, 2010

David J. Kappos
*Director of the United States Patent and Trademark Office*